March 19, 1963  H. H. W. QUENZLER  3,081,964
AIRPLANES FOR VERTICAL AND/OR SHORT TAKE-OFF AND LANDING
Filed Dec. 8, 1958  5 Sheets-Sheet 1

INVENTOR.
HENRY H. W. QUENZLER
BY Roy Mattern Jr.
ATTORNEY

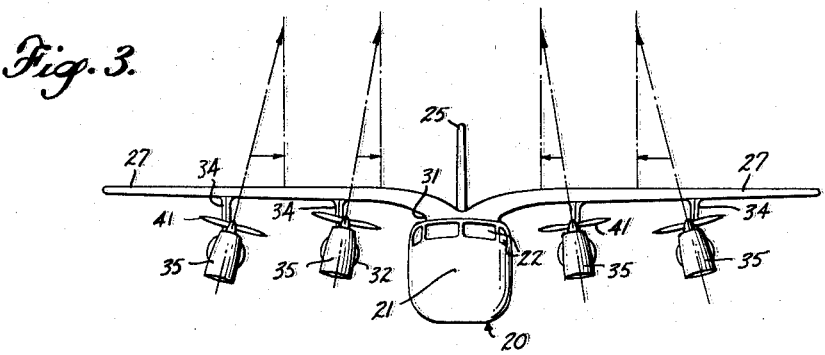
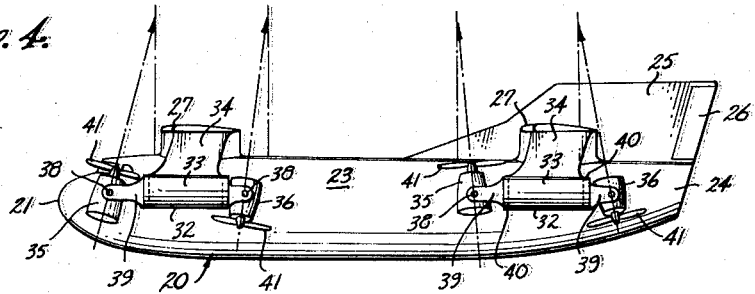
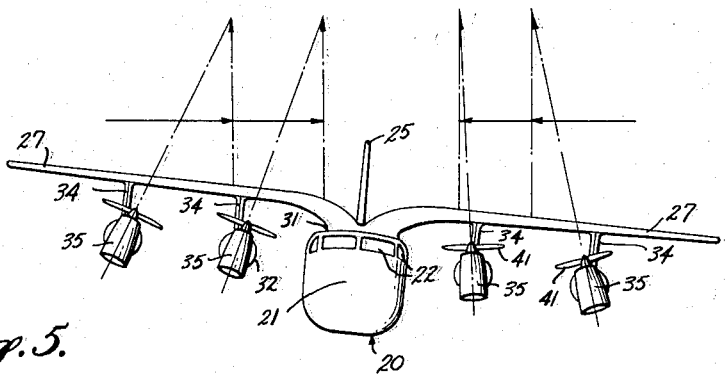

March 19, 1963 H. H. W. QUENZLER 3,081,964
AIRPLANES FOR VERTICAL AND/OR SHORT TAKE-OFF AND LANDING
Filed Dec. 8, 1958 5 Sheets-Sheet 3

INVENTOR.
HENRY H. W. QUENZLER
BY
ATTORNEY

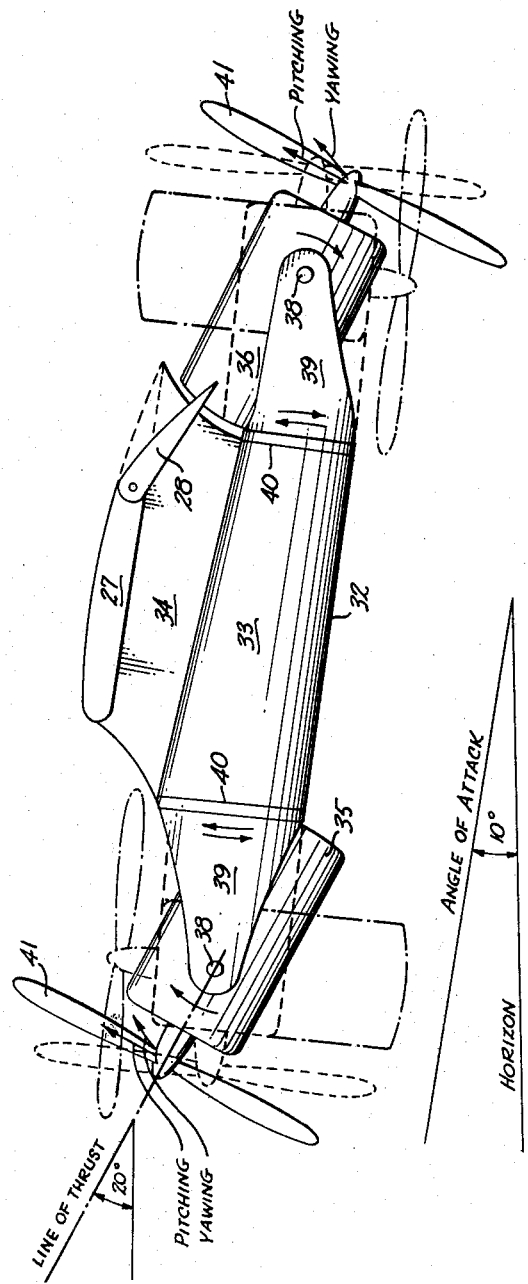

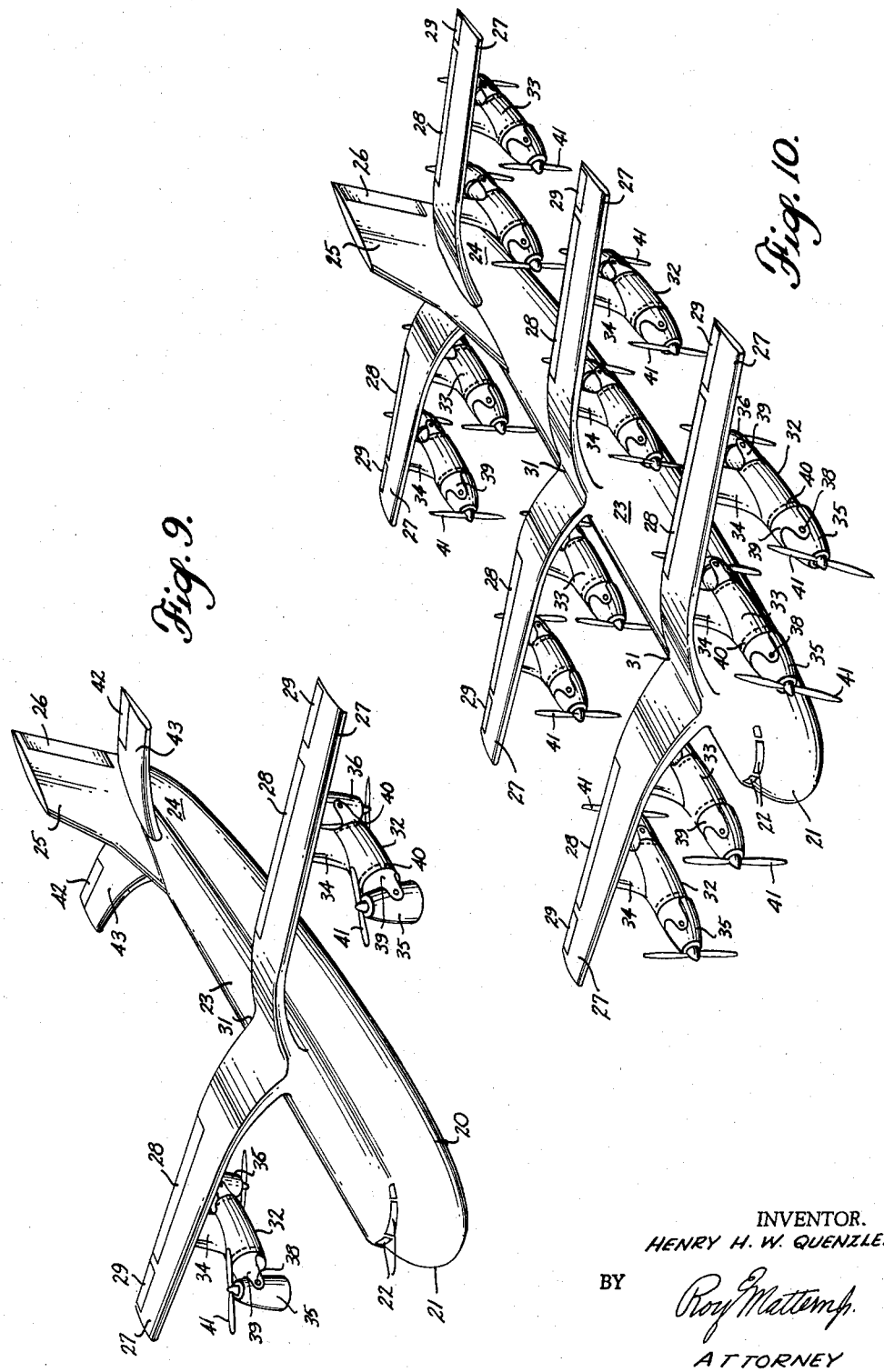

United States Patent Office 3,081,964
Patented Mar. 19, 1963

3,081,964
AIRPLANES FOR VERTICAL AND/OR SHORT
TAKE-OFF AND LANDING
Henry H. W. Quenzler, Seattle, Wash., assignor to Boeing Airplane Company, Seattle, Wash., a corporation of Delaware
Filed Dec. 8, 1958, Ser. No. 778,974
13 Claims. (Cl. 244—7)

This invention relates to airplanes having power plants, the thrust directions of which relative to the aircraft fuselage can be changed so as to produce primarily a forward thrust to effect forward movement of the aircraft, or primarily a vertical thrust upward to facilitate rising of the airplane during take-off, or controlled descent during landing of the airplane, in a confined area. Such airplane has fixed wings for supporting the airplane during substantially horizontal flight.

An important object of the present invention is to provide an airplane which can rise from and descend to the ground steeply, or vertically, while also being capable of normal substantially horizontal flight as an airplane in an efficient manner. Thus, while the propulsion mechanism is arranged to produce an effective upward thrust when desired, such mechanism can be altered to produce a forward thrust and under such conditions will have low drag characteristics. Moreover, such change in thrust direction can be accomplished reasonably quickly without producing undesirable forces on, or stresses in, the airplane.

It is also an important object to provide an airplane propulsion system the thrust direction of which can be changed from substantially horizontal to substantially vertical without greatly increasing the weight of the airplane components, or increasing the complexity of its construction greatly. In accomplishing this object the lift forces produced by power plants creating a vertical thrust are applied to the wings and the wings, in turn, lift the fuselage in generally conventional fashion.

In accomplishing such general object, it is a specific object to mount the power plants on the airplane wings and to arrange them in a manner to produce the least stress concentration in the wing when they are exerting a lifting force on it. Thus, power plants producing a substantially equal thrust will be mounted in corresponding locations fore and aft of the wing so as to produce torsionally balanced forces on the wing. Such power plants are mounted reasonably near the wing root where the wing structure is stronger, in preference to mounting them at or near the wing tip, and if more than one power plant is mounted on one section of the wing such power plants should be distributed along the wing in an arrangement corresponding generally to the strength of the wing. Moreover, rotation of engines fore and aft of a wing are coordinated so as to balance their torque. Thus, the fore and aft propellers of corresponding engines will rotate in opposite directions. Such an arrangement also results in balancing gyroscopic moments produced during change of thrust direction of such engines.

In mounting the power plants on the airplane wings it is an object to avoid as far as possible the creation of negative lift conditions on the wing, and consequent reduction in load-carrying ability, especially during change in thrust direction of the power plants between vertical and horizontal. Such object may largely be accomplished by mounting the power plants in nacelles depending below the wings and fore and aft respectively of the leading edges and trailing edges of the wings, so that when the propeller thrust directions are upright the propeller planes will be below the wing. Such location of the propeller disks beyond the edges of the wings also results in maximum effectiveness of the thrust produced by each power plant in the vertical direction.

More specifically, it is an object to swing propellers or propeller driving power plants in corresponding positions adjacent to the fore and aft edges of a wing about axes located near the propellers so that the forward propeller hub will be elevated as little as possible to reduce interference with the airflow about the wing and the hub of the aft propeller will be lowered a minimum amount so as to provide adequate ground clearance while both of the propeller hubs are moved toward the wing as little as possible.

Another object is to control the change in thrust direction of aircraft power plants so as to produce a small rearward thrust component, if desired, in conjunction with a large vertical thrust component to reduce the speed of the airplane in preparation for landing, or to improve the maneuverability and steering ability of the airplane in other situations.

The airplane of the present invention has a plurality of propulsive units and it is an object to distribute such propulsive units so that lifting forces produced by them will be equalized at opposite sides of the center of gravity of the airplane to maintain stable flight conditions, both during abrupt rise and descent of the airplane and during transition between either such condition and horizontal flight.

More particularly, it is an object to provide one wing, or two or more wings spaced longitudinally of the airplane, so that in normal flight their lift forces are distributed to balance generally about the center of gravity of the airplane on which the power plants are mounted. The power plants will be distributed on such wings so as to produce the same lifting force at opposite sides of the airplane's longitudinal axis, as well as substantially equal forces fore and aft of the airplane's center of gravity.

An additional object is to coordinate the change in direction of the several power plants so that the vertical components of the thrusts produced by such power plants will remain generally in such balance during transitional movement of the power plants changing the thrust direction between substantially horizontal and substantially vertical directions.

To promote the stability of the aicraft it is an object to direct the lines of thrust of the power plants distributed about the center of gravity of the airplane when such thrust directions are principally vertical so that such lines of thrust will converge upwardly substantially to a focus directly above the center of gravity of the airplane to deter both roll and pitch of the airplane. It is a further object, however, to enable selected power plants to be moved for shifting their lines of thrust for the purpose of producing controlled roll or pitching movements of the airplane.

In order to maintain desirable balance of forces and stablization of the airplane during abrupt ascent or descent maneuvers, it is an object to deenergize automatically the other power plant of a pair of power plants which may fail, and/or to deenergize the power plant at the diametrically opposite side of the center of gravity from a power plant which has failed, unless provision is made for compensating for the change in thrust pattern produced by such power plant failure so as to avoid undesirable unbalancing resulting from the thrust forces produced by the remaining power plants in operation during an abrupt ascent or descent.

Another object is to provide an arrangement of power plants in which it is practical, and may be desirable, to deenergize selected power plants during horizontal flight of the airplane.

An additional object is to provide an airplane power plant installation which can be operated satisfactorily in positions such that the line of thrust is in a selected position between horizontal and vertical to expedite takeoff of the airplane under conditions in which it is not necessary for the airplane to ascend substantially vertically during take-off.

A power plant installation for an airplane which will accomplish objects discussed above may include one pair of fixed wings extending oppositely from the upper portion of an airplane fuselage, or a plurality of such wing pairs spaced longitudinally of the fuselage and arranged substantially symmetrically fore and aft of the center of gravity of the airplane; each wing carries one or more pairs of power plants depending beneath it, each pair of power plants being mounted in an engine nacelle. Each pair of power plants includes a forward tractor power plant located adjacent to the leading edge of the wing and an aft pusher power plant adjacent to the trailing edge of the wing. These power plants are preferably of the propeller type. The tractor propeller of the forward power plant and the pusher propeller of the aft power plant, or the power plants and propellers, are respectively mounted to swing about horizontal axes from positions in which their lines of thrust are directed substantially horizontal into positions in which their lines of thrust are directed substantially vertically upward. When the propeller thrusts are substantially vertical the forward propeller should be ahead of the wing's leading edge and the rear propeller should be behind the wing's trailing edge and both propellers should be lower than the wing.

When the thrusts of the various power plants of the airplane are directed upward they are distributed in balanced arrangement fore and aft and at opposite sides of the airplane's center of gravity. It is preferred that the thrust lines all converge substantially to a point approximately directly above the center of gravity of the airplane. The forward and aft power plants of each pair should be swung conjointly in related degrees during transition for moving their thrust lines between substantially horizontal and substantially vertical positions. Wing lift characteristic control devices, such as trailing edge flaps, can be provided to enable the wings to produce effective lift at low forward speeds. The control mechanism may also include safety devices for deenergizing one power plant if a power plant diametrically opposite across the airplane's center of gravity should fail partially or completely.

FIGURE 1 is a top perspective of an airplane illustrating one embodiment of the present invention in which the power plants have their lines of thrust directed substantially horizontally, and FIGURE 2 is a plan of that airplane.

FIGURE 3 is a front elevation and FIGURE 4 is a side elevation of the airplane shown in FIGURES 1 and 2 in which the power plants have been swung to direct their lines of thrust substantilly vertically. FIGURE 5 is a front elevation similar to FIGURE 3 indicating the restoring force produced by power plants when the airplane rolls, and FIGURE 6 is a side elevation similar to FIGURE 4 but indicating the resorting force produced by power plants when the airplane pitches.

FIGURE 8 is a side elevation of the same structure showing the power plants in a different adjusted position in full lines.

FIGURE 9 is a top perspective of another type of airplane embodying the present invention.

FIGURE 10 is a top perspective of still a different type of airplane embodying the present invention.

In general, the purpose of the present invention is to provide an airplane which can take off and land safely with a very short run, or even vertically, but which will still have an effective flying range, can be operated economically at high speed and will have efficient passenger, or cargo, carrying ability. It is therefore required that application of the invention to an airplane involve a minimum of structural changes from conventional practice and not add excessive weight to the airplane design. Moreover, as indicated by a comparison of FIGURES 9 and 10, the invention is applicable to airplanes differing widely in size and consequently in power requirements. The invention is shown applied to an airplane of intermediate size in FIGURES 1 to 6, inclusive.

Figure 1:
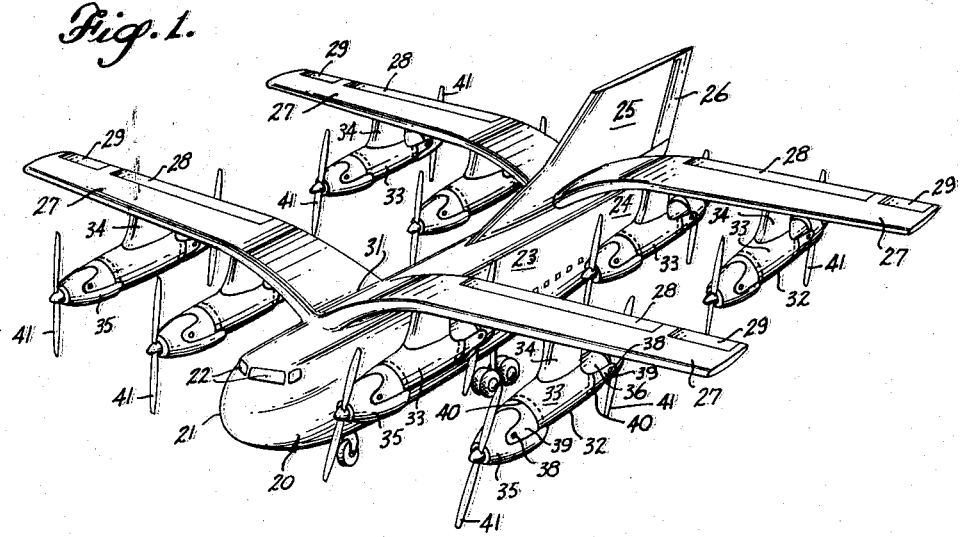

As far as the present invention is concerned, the fuselage 20, including the nose portion 21 having windows 22, the center section 23 and the tail section 24, is conventional with respect to the representative types of airplane shown in FIGURES 1, 9 and 10. Also, the vertical fin 25 and rudder 26 on the tail portion of the fuselage are conventional. Likewise, the wings 27 themselves, including flaps 28 and ailerons 29, may be considered conventional in that each pair of wings will be of suitable aerodynamic design and the flaps and control surfaces will be designed and operated to enable the airplane to be flown like a conventional airplane. Only the arrangement of the wings with respect to the center of gravity of the fuselage where more than one pair of wings is provided may differ from conventional practice in respects discussed below.

Also, the general type of the wing mounting is conventional. Thus, each wing installation is preferably of the high wing monoplane type having its central portion 31 attached to the upper portion of the fuselage 20. The power plant installation will be in nacelles 32 shown in FIGURE 9 and in outboard positions in the airplanes of FIGURES 1 and 10. Where two power plant groups are provided for each wing, the second group is mounted in an inboard nacelle 33 in each instance. Such nacelles 32 and 33 are supported in depending positions below the airplane wing by struts 34. Each nacelle 32, or 33, contains a forward power plant 35 and an aft power plant 36 located adjacent to the leading edge and the trailing edge of the wing respectively. The forward power plant in each case rotates a tractor propeller 41 and the aft power plant rotates a pusher propeller 41. Such power plants may be of the reciprocating piston or turbine type and are arranged to turn the propellers in the same direction relative to the power plants so that the propellers turn oppositely when viewed from a fore and aft position. The propeller torque will therefore be balanced with respect to a nacelle 32, or 33, if the power plants of each pair are being operated at equal speeds.

Figure 2:
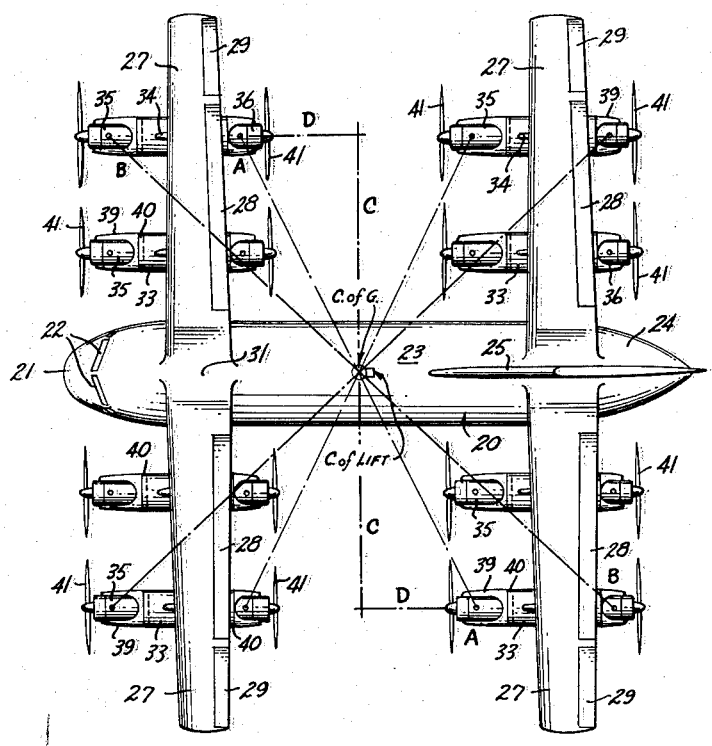

When the airplane is being operated like a conventional airplane the lines of thrust of all the power plants will be substantially horizontal as indicated in FIGURES 1, 2 and 10. An airplane embodying the present invention should be capable of taking off, flying and landing like a conventional airplane. During such operation the rudder, flaps and ailerons will be manipulated and function in the conventional manner. To enable the airplane to take off and land without a run, or with a run less than would otherwise be required, however, provision is made for enabling the line of thrust of some or all of the power plants to be changed in direction to give a larger or smaller vertical upward thrust component. It is important that such change in thrust component be accomplished without altering any more than absolutely necessary the features of the airplane required for normal flight.

The purpose of mounting the propellers, or power plants, so that their thrust directions can be changed to various directions from substantially horizontal to substantially vertical, is to enable the airplane to rise at a steep angle, or even vertically, without the fuselage, or wing, being tilted excessively. The maximum tilt of the wing chord and longitudinal axis of the fuselage from horizontal would be of the same order as used in conventional airplanes so that passengers in the fuselage would not be appreciably uncomfortable and cargo would not be subjected to excessive sliding stresses. The wing would remain at an angle of attack such as to provide useful lift whenever the airplane is moving forward.

In order to enable the direction of power plant thrust to be changed, each propeller is mounted for swinging about a generally horizontal axis extending athwartships of the airplane from a substantially horizontal position through at least 90 degrees, and preferably somewhat more, to a substantially vertical position. Such propeller swinging can be accomplished by mounting each power plant on trunnions 38 carried by a supporting yoke 39. Each propeller can be swung relative to the supporting yoke 39 carrying its trunnions by suitable conventional tilting mechanism, examples of which are found in prior patents.

In the Lapin Patent No. 1,766,390 chain and sprocket drive mechanism is disclosed for tilting a propeller unit about the axis of trunnions mounting it on a yoke. In the Loback Patent No. 2,403,936 quadrants are arranged concentrically with the axis of trunnions of such a unit and the quadrants are swung by motor driven pinions meshing with them. In the Ernest Patent No. 2,403,353 a bevel gear concentric with the propeller unit mounting trunnions is turned by a bevel pinion meshing with such gear and rotated by a flexible drive shaft. In the Hockney Patent No. 2,336,787 a propeller unit is tilted about the axis of its supporting trunnions by a lever arm to which a pull rod or cable is connected. Such mechanism may be considered to be representative for effecting the tilting of the power units of the present device about the axis of the trunnions 38 in each instance.

Figure 7:
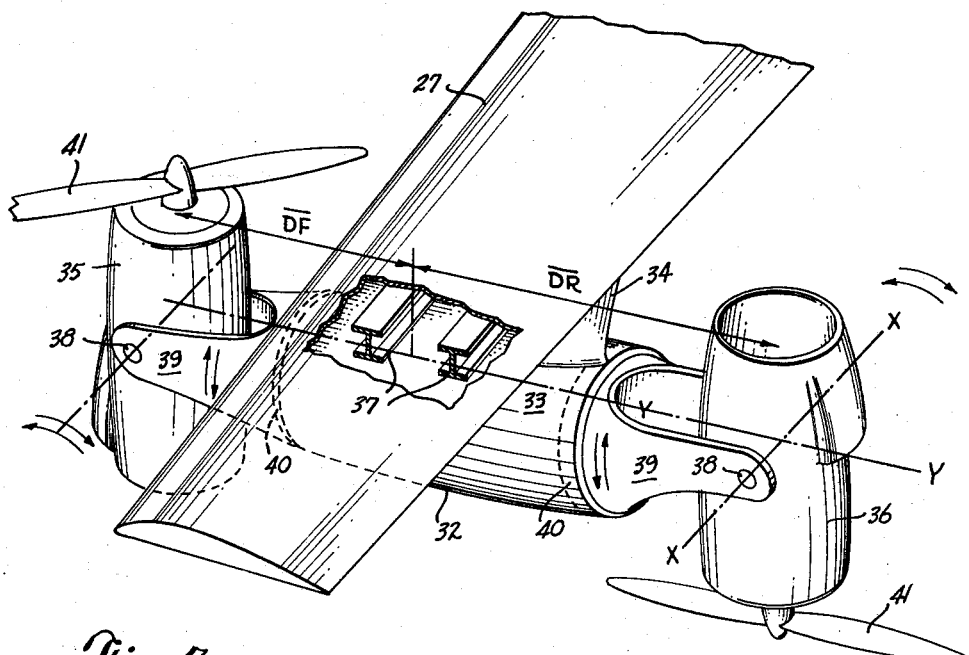
FIGURE 7 is a top perspective of an outboard portion of a wing of an airplane showing the installation of a pair of power plant units, parts being broken away.

In FIGURE 7 the wing 27 is shown as having representative wing spars 37 and the trunnions 38 are shown as being mounted approximately equidistantly fore and aft of these wing spars. When the fore and aft power plants 35 and 36 are swung about their respective trunnions 38 into the solid line positions shown in FIGURE 7, or the dot-dash positions shown in FIGURE 8, the substantially vertical thrusts produced by these power plants will act on the yokes 39 through such trunnions. The yokes, in turn, will transmit the lifting force through the nacelle 32, or 33, and the strut 34 to the wing spars 27. It will thus be evident that the upward thrust produced by the power plants in these positions will be exerted on the same airplane sustaining wing structure as supports the load of the airplane by aerodynamic forces on the wing while the airplane is in normal flight. It is therefore unnecessary to provide any appreciable structural alteration in the wing, or in its attachment at 31 to the fuselage 23, because of the utilization of power plants which can be swung as described above to direct their lines of thrust vertically.

It is, of course, true that during normal flight the aerodynamic forces producing lift on the wing will be distributed throughout the span of the wing, although such lift forces may vary progressively spanwise. It may, therefore, be desirable to produce the vertical lift of the swung power plants at more than one location on the wing, such as afforded by utilizing two pairs of power plants mounted respectively on outboard nacelles 32 and inboard nacelles 33, as shown in FIGURES 1, 2 and 10. If only one pair of power plants is mounted on a wing, as shown in FIGURE 9, such power plants should be located well inboard from the wing tip so as to reduce the bending stresses in the wing. The strengthening of wing structure which may be required because of the concentrated lifting forces produced by the swung power plants will not be very great.

In normal flight the center of lift chordwise of the wing will shift to some extent but the lift forces are distributed along the entire chord so that the torque of the aerodynamic lifting force about a transverse axis located centrally between the spars 37 at any time is not great. To avoid excessive strengthening of the wing structure it is important that the lift forces produced by the swung power plants not create any appreciable greater torque on the wing structure than would occur during normal flight of the airplane. When the power plants are mounted in pairs, as described, with the fore and aft power plants located approximately equidistantly from the wing spars 37, no appreciable torque will be produced on the wing structure by the lift forces of the swung power plants when they are producing approximately equal thrusts.

In order for the propellers of power plants 35 and 36, below the wing, to operate most effectively when such power plants are swung as shown in FIGURE 7 to direct their lines of thrust substantially vertically, the disks swept by the propellers should be blanketed by the wing 27 as little as possible, if at all. Consequently, trunnions 38, which are below the wing, should be located so that their pivot axes are spaced longitudinally of the airplane from the adjacent edges of the wing 27 respectively, a distance at least approximately as great as the radius of the propeller circle. These trunnions preferably are located in the same relationship relative to the fore and aft propellers respectively.

It is particularly important that the propellers of fore and aft power plants of a pair mounted in tandem be arranged so that the propellers turn in opposite directions when the power plants are disposed with their rotative axes extending substantially vertical. Such counter rotation of the propellers of power plants operating at approximately the same speed will balance the torque applied to the airplane so that it will not tend to rotate about a vertical axis approximately through the center of gravity of the airplane. If the torque of the propellers in each pair is thus balanced it is, of course, immaterial how many pairs of power plants are utilized on the airplane, or how they are arranged as far as their tendency to cause the airplane fuselage to yaw is concerned.

While the location of the power plant pairs spanwise of the wing is not critical, the locations of the nacelles should be such that the power plants will produce thrust in desirable locations for horizontal flight of the airplane. A very important feature of the engine arrangement is that when the thrust lines are substantially vertical they are distributed about the center of gravity of the airplane so as to be balanced both fore and aft and from side to side. Thus, as shown in FIGURE 3 for example, there are equal numbers of thrusts at opposite sides of the longitudinal axis of the airplane and they are located correspondingly on opposite sides of such longitudinal axis. As shown in FIGURES 2 and 4, the upright thrusts are distributed fore and aft so that there are the same number of thrusts forward of the center of gravity as aft of it, and such thrusts are arranged at corresponding distances from the center of gravity. The rear engines on the forward wing are located approximately the same distance from the center of the gravity as the forward engines on the rearward wing when the thrust directions are substantially vertical. Similarly, the front engines on the forward wing are located approximately the same distance from the center of gravity as the rear engines on the aft wing. Consequently, the thrust forces fore and aft of the center of gravity in an upward direction are in balance when the airplane is on an even keel and similarly, the upward thrusts are in balance at opposite sides of the center of gravity laterally of the airplane when the thrust lines are substantially vertical. Such balanced distribution of the thrust-producing means about the center of gravity thus provides excellent stability of the airplane during vertical or steep ascent, or descent, of the airplane when the fuselage is approximately horizontal.

The same principle of balancing the upright thrusts both fore and aft of the center of gravity and laterally of the center of gravity is followed irrespective of the number of thrust-producing means employed. While in the airplane of FIGURE 1 sixteen thrust producing units are provided, the airplane shown in FIGURE 9 has the minimum number of thrust-producing units, namely, four. The two forward propellers 41 when directed upwardly are located forward of the center of gravity approximately the same distance as the rearward propellers are located rearwardly of the center of gravity when they are swung downward. Also, the two forward propellers are located approximately equidistantly at opposite sides of the longitudinal axis of the airplane, and the two rear propellers also are located approximately equal distances at opposite sides of the airplane's longitudinal axis. It is preferred that the fore and aft propellers of each pair also be located equal distances from the airplane's longitudinal axis, although this is not essential. In such case, the propeller thrusts will be disposed in rectangular relationship, that is, at the corners of a rectangle the center of which is in substantially vertical registry with the center of gravity. Such rectangular disposition of thrust lines is true of any four of the power plants shown in FIGURE 2 arranged at opposite ends of corresponding diagonals through the vertical projection of the center of gravity. Examples of these are the two inboard front propellers on the forward wing and the two inboard aft propellers on the rear wing, or the two outboard aft propellers on the forward wing and the two outboard forward propellers on the rear wing.

The same principle of balancing thrust lines around the center of gravity is followed in the large airplane of FIGURE 10, in which the central wing is located directly above the center of gravity with the fore and aft engines carried by this wing located equal distances ahead of and behind the center of gravity. Similarly, the engines on the forward wing and on the rearward wing will be arranged with respect to the center of gravity in a manner similar to that described in connection with the airplane shown in FIGURES 1 and 2. Thus, by arranging the engine pairs suspended from the wings symmetrically at opposite sides of the longitudinal axis of the airplane, arranging the wings symmetrically fore and aft of the center of gravity of the airplane and arranging the engine units disposed fore and aft of the center of gravity in symmetrical fashion, the thrust line of each engine when directed substantially vertically will be disposed at a side of the center of gravity of the airplane opposite the substantially vertical thrust line of another engine in a vertical plane extending diagonally of the airplane's longitudinal axis through the center of gravity. Also, the two engines in any such vertical plane will rotate oppositely to balance their torques.

Thus, if an engine at one side of the center of gravity should fail completely or partially, the engine at the opposite side of the center of gravity in the same vertical plane through the center of gravity can be deenergized or its thrust reduced so as to maintain equal the distribution of engine-produced lift forces fore and aft and transversely of the airplane at opposite sides of the center of gravity, as described above, and to preserve balanced torque conditions. In FIGURE 2 each engine of a pair of engines on the port forward wing is shown arranged in the same vertical plane through the center of gravity as an engine of a pair of engines on the aft starboard wing. Such reduction in thrust of an opposite engine may be effected automatically, or by action of the pilot after receiving a warning of a particular engine failure.

Not only should the engines be distributed symmetrically about the center of gravity of the airplane in the manner described above, but it is also preferred that the thrust directions of the several engines when they are directed principally upward actually converge substantially to a point at a greater or lesser height directly above the center of gravity of the airplane. Such arrangement of the lines of thrust produces an automatic stabilizing action on the airplane, both in pitch and in roll, when it is being lifted vertically by the upwardly directed thrusts of the engines. To accomplish such disposition of the thrust lines it is necessary for the trunnions 38, about the axes of which the engines tilt, themselves to be tilted somewhat from horizontal, as indicated by the inclination of the engines in FIGURE 3. Such tilt of the trunnions 38 from horizontal will be greater for the outboard engines than for the inboard engines, and the degree of tilt will vary with the distance of the focal point above the center of gravity of the airplane.

In order to enable the height of the focal point above the airplane's center of gravity to be altered the yokes 39 may be rotatively mounted in the collars 40, as indicated in FIGURE 7, about an axis parallel to the longitudinal axis of the airplane. It should be possible to rotate each such yoke through an angle of at least 45 degrees and preferably as much as 90 degrees. These collars can be rotated by an internal ring gear and pinion drive or by any other conventional rotating mechanism. For each paticular tilt of a pair of trunnions 38 relative to the horizontal, the thrust line of the propeller unit swingable about the axis of such trunnions will trace a different specific arc in a vertical plane through the longitudinal axis of the airplane as such propeller unit is swung about such axis. Changing the tilt of such trunnions will alter the curvature of such arc and its distance above the airplane. Consequently, corresponding and opposite change of tilt of the trunnions of engines located correspondingly on opposite sides of the airplane's longitudinal axis will have an effect comparable to changing the dihedral angle of an airplane wing.

To enable the thrust lines of all engines to converge to a focal point it is necessary for the propellers or engines to be tilted about the axes of the trunnions to the proper angle with respect to the vertical in a fore and aft direction. Thus each engine forward of the center of gravity of the airplane will be swung through an angle somewhat greater than 90 degrees from the horizontal about its trunnions 38, and each engine aft of the center of gravity of the airplane will be swung through an angle somewhat less than 90 degrees. This relationship of the engines is illustrated in FIGURE 4. Moreover, the angle through which each engine should be swung from the horizontal will depend upon the distance of that engine from the center of gravity of the airplane. Thus, as shown in FIGURE 4, the engines farther forward of the center of gravity will be swung through a greater angle from horizontal than the forward engines closer to the center of gravity, whereas the engines farther aft of the center of gravity will be swung through a smaller angle from horizontal than the aft engines closer to the center of gravity.

When the upwardly directed thrust lines of the engines all converge to a focal point, if the airplane during substantially vertical ascent should for some reason roll from the horizontal position shown in FIGURE 3 to a position such as shown in FIGURE 5, the vertical components of the lines of thrust of the port engines will be greater than the vertical components of the corresponding starboard engines, so that the port engines will produce a greater net upward thrust than the starboard engines which will tend to oppose further roll of the airplane, and to right it to the position shown in FIGURE 3.

Figure 6:
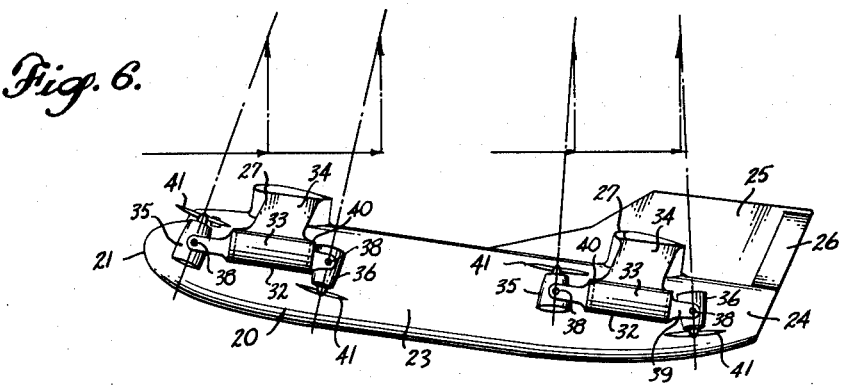

Similarly, if for some reason the airplane should tend to pitch during substantially vertical ascent, so that the nose of the fuselage rises from the position shown in FIGURE 4 to that of FIGURE 6, the vertical components of thrust of the engines aft of the center of gravity will be greater than the vertical components of the thrusts of the corresponding engines forward of the center of gravity, as illustrated in FIGURE 6. The net thrust of the aft engines will therefore exceed the net thrust of the forward engines in a vertical direction so that further rising of the nose will be opposed, and the unbalanced force will tend to raise the tail portion of the airplane so as to restore the airplane to an even keel. Disposition of the engines in the positions shown in FIGURES 3 and 4 will therefore produce inherent static and dynamic stability in the airplane during its substantially vertical ascent.

When the airplane is rising or descending substantially vertically it is possible to effect roll or pitching movements of the fuselage by adjusting the thrust directions of the propellers. The double pivot mounting of the propeller units will enable each propeller to be swung universally, within limits, to alter the thrust direction correspondingly. Thus rolling of the fuselage from a position such as shown in FIGURE 3 could be accomplished by rotating the yokes 39 within the collars 40, those on the port side being rotated so that the thrust lines would extend more nearly vertically, and the starboard engine yokes being turned so that the angle between the thrust lines of these engines and the horizontal would be decreased. Such manipulation would increase the lift on the port side of the airplane so that the starboard wing would dip, but because of the greater horizontal component of the thrust developed by the starboard engines the airplane would skid to port. Alternatively, roll of the airplane with some side slip can be accomplished simply by increasing the thrust of the power plants at one side of the longitudinal axis without change of thrust angle, or decreasing the thrust at the other side, or both.

If the thrust lines of the engines aft of the center of gravity were turned more nearly vertical and the thrust lines of the engines forward of the center of gravity were turned still farther to decrease the angle between them and the horizontal, the greater lifting force on the tail of the airplane would cause the nose to dip and the airplane would be moved rearward because of the greater horizontal component of the thrust of each engine forward of the center of gravity. Alternatively, pitch of the airplane could be effected or altered by increasing or decreasing the thrust of the power plants forward or aft of the center of gravity of the airplane.

Not only is it important for the lines of thrust of the engines to be in proper balance for stability purposes during substantially vertical ascent of the airplane, but it is also important that such balance of vertical forces be maintained during transition of the airplane from a condition where the airplane is sustained solely by the upward thrust of the engines to the condition where the airplane has attained sufficient forward speed so that most or all of its weight is borne by the wings 27. After the airplane has risen a sufficient distance substantially vertically with the engines positioned as shown in FIGURE 4, forward flight is begun. To obtain such forward flight it is, of course, necessary to develop a forward thrust component of the engines. Consequently all the engines will be tilted through a small degree simultaneously about their pivots 38, so that the focal point of the thrust lines of the engines will move forward from a location directly above the center of gravity of the airplane, and each engine will then produce a forward thrust component.

During initial forward movement of the airplane the vertical components of the engine thrusts must still collectively be at least equal to the weight of the airplane to maintain level flight, and preferably will be sufficient to produce further climb of the airplane. Under such propulsive conditions, therefore, the airplane will be operated much like a helicopter in that the airplane wings will produce little or no lift. As the speed of the airplane in a forward direction increases, the airplane will be maneuvered by its normal flight controls to increase its angle of attack as shown in FIGURE 8 so that the wing or wings can begin to develop lift to assist in sustaining the weight of the airplane.

Under such circumstances the slipstream of the propeller forward of the airplane wing is downward past the leading edge of the wing. The direction of the relative wind projected toward the wing's leading edge is therefore influenced initially principally by the flow of air through the propeller disk and progressively to a greater extent by the forward movement of the airplane as it accelerates. In the vicinity of the propeller, however, the wash from the propeller constitutes a very important factor affecting the lift which can be produced by the wing. If the propeller is located above the wing, the relative wind will strike the upper surface of the wing's leading edge, causing it to produce negative lift, when the thrust direction of the propeller is tilted somewhat toward horizontal even if no portion of the propeller disk is directly above the wing. If any portion of the propeller disk overlies the wing the wash from the propeller will cause the wing to produce a much greater negative lift.

Structural considerations involved in mounting the propeller from the wing, if the propeller is to exert a thrust of considerable magnitude in a direction principally vertically, prohibit the propeller from being located very far forward of the wing. The closer the propeller is to the wing the greater will be the effect of the flow through the propeller on the relative wind acting upon the portion of the airplane wing directly aft of the propeller. In order to obtain reasonable lift-producing efficiency of the wing during transition flight while the propeller thrust direction is being changed from an upright direction to horizontal, therefore, it is very important that the hub of each propeller adjacent to the leading edge of the wing be lower than the wing, as well as being as far forward of such leading edge as possible, so as to minimize the production of negative lift by the wing at its leading edge during forward movement of the airplane when the thrust of such propeller is principally vertical.

To obtain such disposition of the propeller hub the trunnions 38 are not only located well below the wing but are reasonably close to the propeller. When the propeller unit is swung about such trunnions so that the thrust line of the propeller is substantially vertical, the entire propeller will be lower than the wing, as shown in dot-dash lines in FIGURE 8. Thus the trunnion axis is located below the wing a distance greater than the distance from such axis to the propeller hub. Also, if the trunnion axis is located similarly relative to each aft propeller, the height of the propeller above the ground or water will be greater when its thrust direction is upright to reduce as far as possible ground or water disturbance when the airplane is being lifted vertically, or is rising steeply.

The detrimental effect on the airflow over the wing caused by the flow of air into the propeller disk forward of the airplane wing when the thrust direction is principally vertical can be reduced by providing on the wing suitable stall-delaying devices, at least over that portion of the wing span directly aft of each tiltable propeller forward of the wing's leading edge. An example of a stall-delaying device for use with a tilting engine arrangement of the present invention is a trailing edge flap on the wing as shown in FIGURE 8. Such flap 28 will be in depressed position during initial forward movement of the airplane. Control to effect upward swinging of such flap may be effected voluntarily by the pilot after the airplane has attained sufficient forward speed, but preferably is effected automatically such as in response to swinging of the forward propeller unit about the axis of its trunnions 38 so that the angle between its thrust line and the longitudinal axis of the airplane is less than a predetermined angle. When the speed of the airplane is increased sufficiently the flap will be swung upward until its profile is in registry longitudinally of the wing with the profile of the wing's trailing portion.

As shown in FIGURE 2, such flaps 28 may extend across both inboard and outboard engines, and they may be controlled independently of the speed of the airplane for the purpose of enabling them to be used as conventional landing flaps when the airplane is being flown as a conventional airplane. These flaps will, of course, be independent of the ailerons 29 shown in FIGURES 1 and 2.

After the airplane has been flown during take-off with the engines positioned with their thrust directions tilted forward from vertical about twenty degrees to produce forward thrust components as well as continuing to produce vertical components sufficient to sustain the weight of the airplane for a length of time sufficient to enable the wing or wings to develop lift substantially equal to the weight of the airplane at a high angle of attack, such as shown in FIGURE 8, the engines are rotated simultaneously about the axes of their trunnions 38 toward the horizontal thrust positions shown in broken lines in FIGURE 8. During such transition of the engines to the broken-line position through the solid line position it is no longer necessary to rely on the engines to produce any vertical thrust component because the weight of the airplane will be fully supported by the fixed wing or wings 27. Because the forward and aft engines are rotating oppositely no unbalanced torque is produced, and such counter-rotation of the engines also practically eliminates any unbalanced gyroscopic effect during such transition.

When the airplane is flying substantially horizontally the flaps 28 of the aft wing, shown in the airplane of FIGURE 2 and that of FIGURE 10, can be used as elevators, while the wing forward of such flaps would serve as a horizontal stabilizer corresponding to the conventional elevators 42 and horizontal stabilizers 43 shown in the airplane species of FIGURE 9. Also, during horizontal flight, in order to increase the cruising range of the airplane, one of the engines in each pair can be stopped and the propeller feathered without increasing the drag greatly. The greatest power demand is, of course, during vertical or steep ascent of the airplane and much less power is required to maintain horizontal flight at cruising speed.

While the power of all the engines collectively should be sufficiently great so that they can lift the airplane vertically while carrying substantial load, the airplane can take off with a short run and ascend steeply while carrying a much greater load. In such case the thrust directions of the propellers would be steeply inclined, such as 40 to 45 degrees to the longitudinal axis of the airplane, but would not be vertical. Under such conditions the wing would develop a very effective lift, especially if the flaps were depressed, which would be supplemented by a large vertical thrust component of the propeller thrust. Under these conditions the airplane would leave the ground and climb steeply while at the same time gaining forward momentum rapidly to increase further the lift force produced by the wings.

Because of the disposition of the hub of each propeller forward of the airplane wing always at a location lower than such wing, and also to a considerable extent because of the use of stall-delaying devices on those portions of the wing behind the propellers which are forward of the wing, an effective combination of propeller thrust lift and wing lift can be maintained during forward flight of the airplane throughout transition movement of the propeller thrust line from a direction of approximately 20 degrees forward of vertical down to horizontal. Because of the ability of the present airplane to maintain satisfactory lift forces during such transition operation, the airplane is capable of carrying comparatively large loads with power plants of a given capacity. While convertible airplanes of previous design might have been capable of lifting a satisfactory load initially for the power expended, they were not able to maintain their altitude during the period of transition from vertical flight to horizontal flight in which the entire weight of the aircraft is sustained by wing lift alone.

I claim as my invention:

1. An airplane comprising a fuselage, wing means fixedly mounted on said fuselage, a plurality of propeller units at each side of the longitudinal axis of the airplane, and means suspending said propeller units from said wing means located so that the propeller units at opposite sides of the longitudinal axis of the airplane are arranged symmetrically about such axis, the number of propeller units forward of the center of gravity of the airplane is equal to the number of propeller units aft of such center of gravity and the distances of the forward propeller units from such center of gravity correspond respectively to the distances of the aft propeller units from the center of gravity, said suspending means including mounting means respectively supporting propeller units for swinging about respective axes extending athwartships of the airplane and tilted to slope downwardly toward the longitudinal central vertical plane of the airplane to alter their thrust directions between generally horizontal forward and principally vertical upward, and the thrust directions being inclined upwardly toward such plane to stabilize the airplane by deterring roll when it is being lifter principally by the combined thrusts of said propeller units.

2. An airplane comprising a fuselage, wing means fixedly mounted on said fuselage, a plurality of propeller units at each side of the longitudinal axis of the airplane and means suspending said propeller units from said wing means located so that the propeller units at opposite sides of the longitudinal axis of the airplane are arranged symmetrically about such axis, the number of propeller units forward of the center of gravity of the airplane is equal to the number of propeller units aft of such center of gravity and the distances of the forward propeller units from such center of gravity correspond respectively to the distances of the aft propeller units from the center of gravity, said suspending means including mounting means respectively supporting propeller units for swinging about respective axes extending athwartships of the airplane and tiltable to alter the thrust directions of such propeller units between generally horizontal forward and principally vertical upward, and the thrust directions being adjustably inclined in different degrees upwardly toward the longitudinal central vertical plane of the airplane to stabilize the airplane by deterring roll and to control the airplane by effecting counter-roll when the airplane is being lifted principally by the combined thrusts of said propeller units.

3. An airplane comprising a fuselage, wing means fixedly mounted on said fuselage, a plurality of propeller units at each side of the longitudinal axis of the airplane, and means suspending said propeller units from said wing means located so that the propeller units at opposite sides of the longitudinal axis of the airplane are arranged symmetrically about such axis, the number of propeller units forward of the center of gravity of the airplane is equal to the number of propeller units aft of such center of gravity and the distances of the forward propeller units from such center of gravity correspond respectively to the distances of the aft propeller units from the center of gravity, said suspending means including mounting means supporting a plurality of propeller units forward of the center of gravity of the airplane and a plurality of propeller units aft of the center of gravity of the airplane for swinging about respective axes extending athwartships of the airplane and tilted to slope downwardly toward the longitudinal central vertical plane of the airplane to alter the thrust directions of the propeller units forward of the center of gravity between generally horizontal forward and principally vertical upward, and the thrust directions being inclined upwardly toward such plane and somewhat rearwardly, and said mounting means supporting said propeller units for swinging movement to alter the thrust directions of the propeller units aft of the airplane's center of gravity between generally horizontal forward and principally vertical upward, and the last-mentioned thrust directions being inclined upwardly toward such plane and somewhat forwardly, to stabilize the airplane by deterring both pitch and roll when it is being lifted principally by the combined thrusts of said propeller units.

4. An airplane comprising a fuselage, wing means fixedly mounted on said fuselage, a plurality of tractor propeller units having propeller hubs, and means suspending said propeller units from said wing means independently of said fuselage, at opposite sides of the longitudinal axis of the airplane and arranged symmetrically about such axis, said suspending means including mounting means supporting said tractor propeller units adjacent to leading edge portions of said wing means for swinging about respective axes extending athwartships of the airplane and located forward of said wing means to alter their thrust directions between generally horizontal forward and principally vertical upward, and each of said mounting means having its axis located lower than the upper surface of the adjacent portion of said wing means a distance greater than the distance between such axis and the hub of the propeller unit mounted thereby to locate the propeller hub of such unit lower than the upper surface of the adjacent portion of said wing means in all swung positions of the propeller unit.

5. The airplane defined in claim 4, in which the wing means includes stall-delaying means located directly behind a tractor propeller unit swingably supported by a mounting means.

6. The airplane defined in claim 4, in which the wing means includes a trailing edge flap swingable relative to the wing means from a generally horizontal position into a downward swung position and located directly behind a propeller unit swingably supported by a mounting means.

7. An airplane comprising a fuselage, wing means fixedly mounted on said fuselage, a plurality of propeller units at each side of the longitudinal axis of the airplane and having propeller hubs, and means suspending said propeller units from said wing means located so that the propeller units at opposite sides of the longitudinal axis of the airplane are arranged symmetrically about such axis, the number of propeller units forward of the center of gravity of the airplane is equal to the number of propeller units aft of such center of gravity and the distances of the forward propeller units from such center of gravity correspond respectively to the distances of the aft propeller units from the center of gravity, said suspending means including mounting means supporting said propeller units in tandem pairs, the front propeller unit of each pair being adjacent to a leading edge portion of said wing means and supported by its mounting means for swinging about an axis extending athwartships of the airplane to alter its thrust direction between generally horizontal forward and principally vertical upward, the rear propeller unit of each pair being adjacent to a trailing edge portion of said wing means, and each of said mounting means for a front propeller unit having its axis located lower than the upper surface of the adjacent portion of said wing means a distance greater than the distance between such axis and the hub of the propeller unit mounted thereby to locate the propeller hub of such unit lower than the upper surface of the adjacent portion of said wing means in all swung positions of the propeller unit.

8. An airplane comprising a fuselage, wing means fixedly mounted on said fuselage, a plurality of propeller units at each side of the longitudinal axis of the airplane and having propeller hubs, and means suspending said propeller units from said wing means located so that the propeller units at opposite sides of the longitudinal axis of the airplane are arranged symmetrically about such axis, the number of propeller units forward of the center of gravity of the airplane is equal to the number of propeller units aft of such center of gravity and the distances of the forward propeller units from such center of gravity correspond respectively to the distances of the aft propeller units from the center of gravity, said suspending means including mounting means supporting said propeller units in tandem pairs, the front propeller unit of each pair having a tractor propeller and being adjacent to a leading edge portion of said wing means and supported by its mounting means for swinging about an axis extending athwartships of the airplane to alter its thrust direction between generally horizontal forward and principally vertical upward, the rear propeller unit of each pair having a pusher propeller and being adjacent to a trailing edge portion of said wing means, the tractor propeller of the front propeller unit and the pusher propeller of the rear propeller unit of each pair of propeller units rotating in opposite directions when viewed from a position forward of both propeller units, and each of said mounting means for a front propeller unit having its axis located lower than the upper surface of the adjacent portion of said wing means a distance greater than the distance between such axis and the hub of the propeller unit mounted thereby to locate the propeller hub of such unit lower than the upper surface of the adjacent portion of said wing means in all swung positions of the propeller unit.

9. An airplane comprising a fuselage, wing means fixedly mounted on said fuselage, a plurality of propeller units at each side of the longitudinal axis of the airplane and having propeller hubs, and means suspending said propeller units from said wing means located so that the propeller units at opposite sides of the longitudinal axis of the airplane are arranged symmetrically about such axis, the number of propeller units forward of the center of gravity of the airplane is equal to the number of propeller units aft of such center of gravity and the distances of the forward propeller units from such center of gravity correspond respectively to the distances of the aft propeller units from the center of gravity, said suspending means including mounting means supporting said propeller units in tandem pairs, the front propeller unit of each pair being adjacent to a leading edge portion of said wing means, and the rear propeller unit of each pair being adjacent to a trailing edge portion of said wing means, both the front propeller unit and the rear propeller unit of each pair being supported by their mounting means for swinging about an axis extending athwartships of the airplane to alter their thrust directions between generally horizontal forward and principally vertical upward, the propeller of the front propeller unit swinging upward and the propeller of the rear propeller unit swinging downward, and each of said mounting means for a front propeller unit having its axis located lower than the upper surface of the adjacent portion of said wing means a distance greater than the distance between such axis and the hub of the front propeller unit mounted thereby, to locate the propeller hub of such unit lower than the upper surface of the adjacent portion of said wing means in all swung positions of such front propeller unit.

10. An airplane comprising a fuselage, a plurality of wings fixedly mounted on said fuselage and including a forward wing ahead of the center of gravity of the airplane and an aft wing behind the center of gravity of the airplane, a plurality of tractor and pusher propeller units, and means supporting said propeller units from said wings at opposite sides of the longitudinal axis of the airplane arranged symmetrically about such axis, a number of tractor propeller units being supported adjacent to the leading edge of one of said wings equal in number to pusher propeller units supported adjacent to the trailing edge of the other wing, said supporting means including mounting means supporting corresponding tractor and pusher propeller units for swinging about respective axes extending athwartships of the airplane to alter their thrust directions between generally horizontal and principally vertical.

11. An airplane comprising a fuselage, a plurality of wings fixedly mounted on said fuselage and including a forward wing ahead of the center of gravity of the airplane and an aft wing behind the center of gravity of the airplane, a plurality of tractor and pusher propeller units, and means supporting said propeller units from said wings at opposite sides of the longitudinal axis of the airplane arranged symmetrically about such axis, a number of tractor propeller units being supported adjacent to the leading edge of one of said wings equal in number to pusher propeller units supported adjacent to the trailing edge of the other wing and a vertical plane passing through the center of gravity of the airplane and intersecting a propeller unit at one side of such center of gravity intersects another such propeller unit located at the opposite side of such center of gravity and the same distance from it, said supporting means including mounting means supporting corresponding tractor and pusher propeller units for swinging about respective axes extending athwartships of the airplane to alter their thrust directions between generally horizontal and principally vertical.

12. An airplane comprising a fuselage, a plurality of wings fixedly mounted on said fuselage and including a forward wing ahead of the center of gravity of the airplane and an aft wing behind the center of gravity of the airplane, a plurality of tractor and pusher propeller units, and means suspending said propeller units from said wings at opposite sides of the longitudinal axis of the airplane arranged symmetrically about such axis, a number of tractor propeller units being suspended adjacent to the leading edge of said forward wing equal in number to pusher propeller units suspended adjacent to the trailing edge of said aft wing, said suspending means including mounting means supporting tractor propeller units adjacent to the leading edge portion of said forward wing for swinging about respective axes extending athwartships of the airplane to alter their thrust direction between generally horizontal forward and principally vertical upward.

13. An airplane comprising a fuselage, a plurality of wings fixedly mounted on said fuselage and including a forward wing ahead of the center of gravity of the airplane and an aft wing behind the center of gravity of the airplane, a plurality of tractor and pusher propeller units, and means suspending said propeller units from said wings at opposite sides of the longitudinal axis of the airplane arranged symmetrically about such axis, a number of tractor propeller units being suspended adjacent to the leading edge of said forward wing equal in number to pusher propeller units suspended adjacent to the trailing edge of said aft wing, said suspending means including mounting means supporting said propeller units in tandem pairs, each pair including a front tractor propeller and a rear pusher propeller, the front tractor propeller unit of each pair being adjacent to a leading edge portion of one of said wings and supported by its mounting means for swinging about an axis extending athwartships of the airplane to alter its thrust direction between generally horizontal forward and principally vertical upward, and the rear pusher propeller unit of each pair being adjacent to a trailing edge portion of one of said wings and supported by its mounting means for swinging about an axis extending athwartships of the airplane to alter its thrust direction between generally horizontal aft and principally vertical downward.

References Cited in the file of this patent

UNITED STATES PATENTS

| | | |
|---|---|---|
| 1,009,010 | De Bajza | Nov. 14, 1911 |
| 1,498,412 | Whiteside | June 17, 1924 |
| 1,786,545 | Noeggerath | Dec. 30, 1930 |
| 1,881,792 | Mariani | Oct. 11, 1932 |
| 1,891,166 | Leupold | Dec. 13, 1932 |
| 1,987,788 | Morton | Jan. 15, 1935 |
| 2,336,787 | Hockney | Dec. 14, 1943 |
| 2,403,353 | Ernest | July 2, 1946 |
| 2,403,936 | Loback | July 16, 1946 |
| 2,621,871 | Robert | Dec. 16, 1952 |
| 2,677,931 | Prieto | May 11, 1954 |
| 2,702,168 | Platt | Feb. 15, 1955 |
| 2,835,456 | Kaplan | May 20, 1958 |
| 2,891,740 | Campbell | June 23, 1959 |
| 2,937,823 | Fletcher | May 24, 1960 |

FOREIGN PATENTS

| | | |
|---|---|---|
| 354,519 | Italy | Nov. 25, 1937 |
| 666,491 | Great Britain | Feb. 13, 1952 |